(12) United States Patent
Cui et al.

(10) Patent No.: US 11,870,029 B2
(45) Date of Patent: *Jan. 9, 2024

(54) SEPARATOR AND ENERGY STORAGE DEVICE

(71) Applicant: NINGDE AMPEREX TECHNOLOGY LIMITED, Ningde (CN)

(72) Inventors: Wei Cui, Ningde (CN); Xinghua Tao, Ningde (CN); Cong Cheng, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 181 days.

This patent is subject to a terminal disclaimer.

(21) Appl. No.: 17/204,739

(22) Filed: Mar. 17, 2021

(65) Prior Publication Data

US 2021/0203036 A1    Jul. 1, 2021

Related U.S. Application Data

(63) Continuation of application No. 16/174,234, filed on Oct. 29, 2018, now Pat. No. 10,991,927.

(30) Foreign Application Priority Data

Apr. 11, 2018 (CN) .......................... 201810323660.1

(51) Int. Cl.
*H01M 50/414* (2021.01)
*H01M 10/0525* (2010.01)
(Continued)

(52) U.S. Cl.
CPC ..... *H01M 10/0525* (2013.01); *H01M 50/414* (2021.01); *H01M 50/417* (2021.01);
(Continued)

(58) Field of Classification Search
CPC ........... H01M 50/449; H01M 10/0525; H01M 50/411; H01M 50/446; H01M 50/414;
(Continued)

(56) References Cited

U.S. PATENT DOCUMENTS

2013/0224552 A1   8/2013   Hong et al.
2016/0218340 A1   7/2016   Ryu et al.

FOREIGN PATENT DOCUMENTS

CN    1446243 A    10/2003
CN    101000952 A   7/2007
(Continued)

OTHER PUBLICATIONS

Cui, Office Action, U.S. Appl. No. 16/174,234, dated Feb. 28, 2020, 9 pgs.
(Continued)

*Primary Examiner* — Cynthia K Walls
(74) *Attorney, Agent, or Firm* — Morgan, Lewis & Bockius LLP

(57) ABSTRACT

A separator includes: a first porous substrate; and a second porous substrate arranged on at least one surface of the first porous substrate; wherein the elongation at break of the second porous substrate is greater than the elongation at break of the first porous substrate in at least one of the machine and transverse directions of the separator. The separator has a high tensile strength and an elongation at break and good heat resistance, and may improve the safety performance of the energy storage device when the separator is applied to the energy storage device.

19 Claims, 1 Drawing Sheet

(51) Int. Cl.
*H01M 50/446* (2021.01)
*H01M 50/423* (2021.01)
*H01M 50/417* (2021.01)
*H01M 50/42* (2021.01)
*H01M 50/426* (2021.01)
*H01M 50/429* (2021.01)
*H01M 50/451* (2021.01)
*H01M 50/494* (2021.01)
*H01M 50/489* (2021.01)
*H01M 50/457* (2021.01)

(52) U.S. Cl.
CPC ......... *H01M 50/42* (2021.01); *H01M 50/423* (2021.01); *H01M 50/426* (2021.01); *H01M 50/429* (2021.01); *H01M 50/446* (2021.01); *H01M 50/451* (2021.01); *H01M 50/457* (2021.01); *H01M 50/489* (2021.01); *H01M 50/494* (2021.01)

(58) Field of Classification Search
CPC .. H01M 50/417; H01M 50/42; H01M 50/423; H01M 50/426; H01M 50/429; H01M 50/451; H01M 50/457; H01M 50/489; H01M 50/494; Y02E 60/10
See application file for complete search history.

(56) References Cited

FOREIGN PATENT DOCUMENTS

| | | | |
|---|---|---|---|
| CN | 101286554 | A | 10/2008 |
| CN | 101826606 | A | 9/2010 |
| CN | 102231431 | A | 11/2011 |
| CN | 102906901 | A | 1/2013 |
| CN | 103035864 | A | 4/2013 |
| CN | 103296239 | A | 9/2013 |
| CN | 104508864 | A | 4/2015 |
| CN | 105449140 | A | 3/2016 |
| CN | 106159173 | A | 11/2016 |

OTHER PUBLICATIONS

Cui, Office Action, U.S. Appl. No. 16/174,234, dated Jul. 30, 2020, 7 pgs.
Cui, Notice of Allowance, U.S. Appl. No. 16/174,234, dated Dec. 30, 2020, 14 pgs.
Translation of CN105449140, as retrieved from <www.espacenet.com> on Feb. 19, 2020.
Office Action, CN201810323660.1, dated Aug. 18, 2021, 9 pgs.
Ningde New Energy Technology Co. Ltd., Notification to Grant Patent Right for Invention, CN201810323660.1, dated Oct. 19, 2021, 7 pgs.

SEPARATOR AND ENERGY STORAGE DEVICE

CROSS-REFERENCE TO RELATED APPLICATION

This is a continuation application of U.S. patent application Ser. No. 16/174,234, entitled "SEPARATOR AND ENERGY STORAGE DEVICE" filed on Oct. 29, 2018, assigned to the same assignee, which is based on and claims priority to Chinese Patent Application No. 201810323660.1 filed on Apr. 11, 2018, the contents of which are incorporated by reference herein in their entirety.

TECHNICAL FIELD

The present application relates to the field of energy storage device, in particular, to a separator and an energy storage device.

BACKGROUND

A separator is an important component of the lithium ion battery. In the lithium ion battery, it mainly functions to isolate the positive and negative electrodes, prevents short circuit due to the direct contact between the positive and negative electrodes, and also functions to conduct lithium ions. Therefore, the performance of the separator greatly affects the overall performance of the lithium ion battery, especially the safety performance. The commercial separator mainly comprises polyolefin materials such as polyethylene and polypropylene. On the one hand, the cost of the polyolefin material is low. On the other hand, the good mechanical properties, thermal properties and insulation properties of the polyolefin material can satisfy the requirements for assembly and application of lithium ion battery.

However, when a lithium ion battery is inevitably subjected to high deformation external forces such as collision, nail, impact, etc., the poor tensile strength and elongation at break of the separator increase the possibility of short circuit between the positive and negative electrodes. Therefore, it is indeed necessary to develop a separator having good tensile strength and elongation at break.

SUMMARY

In schematic diagram of the problems in Background, an object of the present application is to provide a separator and an energy storage device (for example, a lithium ion battery). Since the separator has a high tensile strength and elongation at break while having a good heat resistance, the pass rate of impact, nail test for energy storage devices (e.g. lithium ion battery) may be increased when it is applied to an energy storage device such as a lithium ion battery, thereby improving the safety performance of energy storage devices (e.g. lithium ion battery).

The present application provides a separator including: a first porous substrate; and a second porous substrate arranged on at least one surface of the first porous substrate; wherein, an elongation at a break of the second porous substrate is greater than an elongation at a break of the first porous substrate in at least one of a machine or a transverse directions of the separator.

In the above separator, wherein the elongation at the break of the second porous substrate is 105% to 800% in the machine and the transverse directions.

In the above separator, wherein a ratio of thickness of the first porous substrate to the second porous substrate is 1:2 to 3:2.

In the above separator, wherein the second porous substrate has a tensile strength of 150 kgf/cm² or more in the machine and the transverse directions.

In the above separator, wherein the first porous substrate includes one or more selected from the group consisting of polypropylene (PP), polyethylene (PE), polyethylene terephthalate (PET), polyimide (PI), or polyphthalaldehyde phenyl diamine.

In the above separator, wherein the second porous substrate includes one or more selected from the group consisting of polyvinylidene fluoride, polytetrafluoroethylene, or polyurethane.

In the above separator, wherein the second porous substrate further includes an inorganic particle, and the inorganic particle is one or more selected from the group consisting of alumina, silica, magnesia, titania, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide or barium sulfate.

In the above separator, further including a binder layer disposed between the first porous substrate and the second porous substrate.

In the above separator, wherein the binder layer includes a binder selected from one or more of polyvinylidene fluoride, polytetrafluoroethylene, polyacrylate, carboxymethyl cellulose sodium, styrene butadiene rubber, or polyurethane.

In the above separator, wherein the binder layer includes a hot melt adhesive selected from one or more of a TPU hot melt adhesive, an EVA hot melt adhesive, or a butyl sealant.

In the above separator, wherein the peeling force between the first porous substrate and the second porous substrate is 0.1 N/m to 20 N/m.

The present application also provides an energy storage device including the above separator.

In the above energy storage device, wherein the energy storage device includes a lithium ion battery.

The separator of the present application includes a first porous substrate and a second porous substrate arranged on a surface of the first porous substrate. The separator of the present application not only has a high tensile strength and elongation at break but also has a good heat resistance. The pass rate of impact, nail test for energy storage devices (e.g. lithium ion battery) may be increased when the separator of the present application is applied to an energy storage device (e.g. lithium ion battery), thereby improving the safety performance of energy storage devices (e.g. lithium ion battery).

Figure 1:
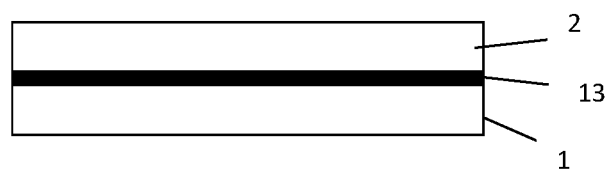
FIG. 1 is a schematic diagram of the separator formed by disposing a binder layer between the first porous substrate and the second porous substrate.

Among them, the reference numerals are as follows:
1 the first porous substrate
2 the second porous substrate
13 the binder layer
23 the hot melt adhesive

DETAILED DESCRIPTION

The exemplary examples are described in sufficient detail below, but these exemplary examples may be implemented in various ways and should not be construed as being limited to the examples set forth herein. Rather, these examples are provided so that the present application will be thorough and complete and the scope of the present application is fully conveyed to those skilled in the art.

The separator according to the first aspect of the present application includes a first porous substrate and a second porous substrate. The second porous substrate is arranged on surface of the first porous substrate. The second porous substrate may be arranged on a surface on either side or both sides of the first porous substrate. The first porous substrate may be selected from one or more of a polyolefin and a nonwoven fabric. Specifically, the first porous substrate may include one or more of polypropylene (PP), polyethylene (PE), polyethylene terephthalate (PET), polyimide (PI), and polyphthalaldehyde phenyl diamine. The second porous substrate may include one or more of polyvinylidene fluoride (PVDF), polytetrafluoroethylene (PTFE), and polyurethane.

In some examples, the elongation at break of the second porous substrate in a machine direction (MD) is greater than the elongation at break of the first porous substrate in the machine direction; or the elongation at break of the second porous substrate in the transverse direction (TD) is greater than the elongation at break of the first porous substrate in the transverse direction; or the elongation at break of the second porous substrate in the machine direction is greater than the elongation at break of the first porous substrate in the machine direction and the elongation at break of the second porous substrate in the transverse direction is greater than that of the first porous substrate in the transverse direction. It should be noted that when the electrode assembly of the lithium ion battery is of wound structure, the machine direction refers to the wound direction of the electrode assembly and the transverse direction refers to the direction perpendicular to the machine direction; when the electrode assembly of the lithium ion battery is of a stacked or folded structure, the machine direction refers to the machine direction of the separator, and the transverse direction refers to the direction perpendicular to the machine direction.

In some examples, the separator obtained by combining the first porous substrate and the second porous substrate retains both the advantage of high tensile strength of the first porous substrate and property of high elongation at break of the second porous substrate. When it is applied to an energy storage device such as a lithium ion battery, the safety performance of an energy storage device such as a lithium ion battery may be significantly improved. Generally, the small elongation at break of the first porous substrate results in poor elongation of the first porous substrate. When the first porous substrate is directly used as a separator in an energy storage device (e.g. a lithium ion battery), the risk of short circuit between the positive and negative electrodes is increased after multiple cycles, and then the safety performance of energy storage device (e.g. lithium ion battery) is affected. The present application combines a second porous substrate having a machine and/or transverse direction elongation at break greater than that of the first porous substrate with the first porous substrate, so that the separator has both high elongation at break and high tensile strength in order to improve the safety performance of energy storage device (e.g. lithium ion battery). At the same time, the second porous substrate is combined with the first porous substrate to avoid short circuit between the positive and negative electrodes caused by heat shrinkage of the first porous substrate, so that the separator has a better heat resistance, thereby further improving the safety performance of energy storage device (e.g. lithium ion battery). In addition, during the process of combining the second porous substrate with the first porous substrate, the microporous structure of the second porous substrate remains unchanged, and the uniformity and consistency may be maintained, thereby not affecting the conduction of lithium ions. Therefore, the safety performance of energy storage device (e.g. lithium ion battery) may be improved without affecting the electrochemical performance of energy storage device (e.g. lithium ion battery).

In some examples, the elongation at break of the second porous substrate in the machine direction is greater than or equal to 1.5 times the elongation at break of the first porous substrate in the machine direction; in some examples, the elongation at break of the second porous substrate in the transverse direction is greater than or equal to 1.5 times the elongation at break of the first porous substrate in the transverse direction; in some examples, the elongation at break of the second porous substrate in the machine direction is greater than or equal to 1.5 times the elongation at break of the first porous substrate in the machine direction and the elongation at break of the second porous substrate in the transverse direction is greater than or equal to 1.5 times that of the first porous substrate in the transverse direction.

In some examples, the second porous substrate has an elongation at break of 105% to 800% in the machine direction. In some examples, the second porous substrate has an elongation at break of 105% to 800% in the transverse direction.

In some examples, the ratio of thickness of the first porous substrate to the second porous substrate may be 1:2 to 3:2. In some examples, the second porous substrate has a thickness of 3 μm to 30 μm. If the ratio of thickness of the first porous substrate to the second porous substrate is too large, that is, the thickness of the second porous substrate is too small, the separator mainly exhibits the properties of the first porous substrate and the elongation at break is still low, so the safety performance of energy storage device (e.g. lithium ion battery) cannot be improved. If the ratio of thickness of the first porous substrate to the second porous substrate is too small, that is, the thickness of the second porous substrate is too large, the obtained separator has a large thickness, then a large loss may be caused to the energy density of an energy storage device (e.g. lithium ion battery).

In some examples, the peeling force between the first porous substrate and the second porous substrate may be 0.1 N/m to 20 N/m. Since the elongation at break of the first porous substrate is not high and the elongation at break of the second porous substrate in the machine direction and the transverse direction is greater than that of the first porous substrate, the peeling force between the first porous substrate and the second porous substrate should not be too large in order to make the separator have a high elongation at break. If the peeling force between the first porous substrate and the second porous substrate is too small, the first porous substrate and the second porous substrate cannot be bound together due to the small peeling force, so the separator cannot balance the respective advantages of the first porous substrate and the second porous substrate; if the peeling force between the first porous substrate and the second porous substrate is too large, the second porous substrate is caused to extend along with the first porous substrate as it extends along with the nail when a nail is nailed, and then the first porous substrate may be broken as the elongation at break of the first porous substrate is small.

In some examples, the tensile strength of the second porous substrate in the machine direction may larger than or equal to 150 kgf/cm². In some examples, the tensile strength of the second porous substrate in the transverse direction may larger than or equal to 150 kgf/cm².

In some examples, the second porous substrate further includes inorganic particles, which play a role of increasing strength in the second porous substrate, may prevent the risk of damage of the separator caused by shrinkage deformation after being heated, improves the thermal resistance of the separator, thereby further improves the safety performance of energy storage device (e.g. lithium ion battery). The inorganic particle may include one or more of alumina, silica, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The content of the inorganic particle is 5% to 15% of the total mass of the second porous substrate.

In some examples, the first porous substrate and the second porous substrate may be bound by a binder layer including one or more of a binder and a hot melt adhesive. When the binder layer is a hot melt adhesive, the peeling force between the first porous substrate and the second porous substrate may usually be adjusted by controlling the hot pressing temperature and the hot pressing time. Among them, the hot pressing temperature may be 30° C. to 327° C., and the hot pressing pressure may be 0.3 Mpa to 1.5 Mpa. The thinner the thickness of the binder layer, the better. When the thickness of the bonding layer is large, the transmission of lithium ions between the positive and negative electrodes is easily affected. The binder may be applied to the first porous substrate by spin coating, air gun spraying, and gravure printing.

In some examples, when the first porous substrate and the second porous substrate are bound by a binder, the binder may be selected from one or more of polyvinylidene fluoride (PVDF), polytetrafluoroethylene (PTFE), polyacrylate, carboxymethyl cellulose sodium (CMC), styrene butadiene rubber (SBR), and polyurethane. As shown in FIG. 1, the binder may be uniformly applied to the surface of the first porous substrate 1 to form a binder layer 13 between the first porous substrate 1 and the second porous substrate 2. The binder may also be uniformly applied to the surface of the first porous substrate 1 in a dot-like manner to form an island-shaped discontinuously-distributed binder layer between the first porous substrate 1 and the second porous substrate 2.

Figure 2:
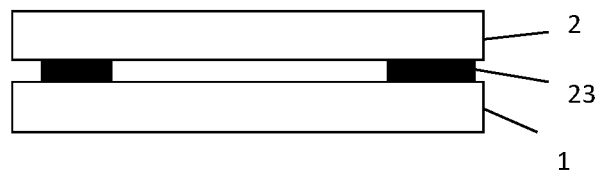
FIG. 2 is a schematic diagram of the separator formed by disposing a hot melt adhesive between the first porous substrate and the second porous substrate, wherein the binding pattern shown in FIG. 2 is a discontinuous dot binding.

In some examples, when the first porous substrate and the second porous substrate are bound by a hot melt adhesive, as shown in FIG. 2, the hot melt adhesive may be uniformly applied to the surface of the first porous substrate 1 in a dot-like manner to form an island-shaped discontinuously-distributed hot melt adhesive 23 between the first porous substrate 1 and the second porous substrate 2. The hot melt adhesive may also be uniformly applied on the surface of the second porous substrate 2. In some examples, the hot melt adhesive has a softening point of no greater than 100° C. The hot melt adhesive may be selected from one or more of a TPU hot melt adhesive, an EVA hot melt adhesive, and a butyl sealant.

The present application also provides an energy storage device including the above separator. A lithium ion battery is described as an example of an energy storage device in the present application, but the present application is not limited thereto. In the present application, in addition to including a separator, the lithium ion battery further includes a positive electrode containing a positive electrode material, a negative electrode containing a negative electrode material and an electrolyte, wherein the separator of the present application is inserted between the positive electrode and the negative electrode. The positive current collector may be an aluminum foil or a nickel foil, and the negative current collector may be a copper foil or a nickel foil.

In the above lithium ion battery, the positive electrode includes a positive electrode material including a positive electrode material (hereinafter, sometimes referred to as "positive electrode material capable of intercalating/deintercalating lithium Li") capable of intercalating and deintercalating lithium (Li). Examples of the positive electrode material capable of intercalating/deintercalating lithium Li may include lithium cobaltate, lithium nickel cobalt manganese oxide, lithium nickel cobalt aluminate oxide, lithium manganese oxide, lithium ferromanganese phosphate, lithium vanadium phosphate, lithium vanadium phosphate oxide, lithium iron phosphate, lithium titanate, and lithium-rich manganese-based materials.

In the above positive electrode material, the chemical formula of lithium cobaltate may be $Li_xCo_aM1_bO_{2-c}$, wherein M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon, and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$;

In the above positive electrode material, the chemical formula of lithium nickel cobalt manganate or lithium nickel cobalt aluminate may be $Li_yNi_dM2_eO_{2-f}$, wherein M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$;

In the above positive electrode material, the chemical formula of lithium manganate may be $Li_zMn_{2-g}M3_gO_{4-h}$, wherein M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \leq z \leq 1.2$, $0 \leq g \leq 1.0$ and $-0.2 \leq h \leq 0.2$.

In the above lithium ion battery, the negative electrode includes a negative electrode material including the negative electrode material (hereinafter, sometimes referred to as "positive electrode material capable of intercalating/deintercalating lithium Li") capable of intercalating and deintercalating lithium (Li). Examples of the negative electrode material capable of intercalating/deintercalating lithium Li may include carbon materials, metal compounds, oxides, sulfides, nitrides of lithium such as $LiN_3$, lithium metal, metals which form alloys together with lithium and polymer materials.

In the above negative electrode material capable of intercalating and deintercalating lithium (Li), examples of carbon materials may include low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may include pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may include polyacetylene and polypyrrole.

Further, in above negative electrode material capable of intercalating/deintercalating lithium Li, a material whose charging and discharging voltages are close to the charging and discharging voltages of lithium metal is selected. This is because the lower the charging and discharging voltage of the negative electrode material, the easier the battery is to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalating/deintercalating lithium (Li) may include elemental lithium metal, metal elements and semimetal elements capable of forming an alloy together with lithium (Li), and alloys and compounds of such elements. In particular, they are used together with carbon materials because in this case, good cycle characteristics as well as high energy density may be obtained. In addition to alloys including two or more metal elements, the alloys used herein also include alloys including one or more metal elements and one or more semi-metal elements. The alloy may be in the form of a solid solution, a eutectic crystal (eutectic mixture), an intermetallic compound, and a mixture thereof.

Examples of above metal element and the semi-metal element may include tin (Sn), plumbum (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may include a material having a chemical formula $Ma_sMb_tLi_u$ and a material having a chemical formula $Ma_pMc_qMd_r$. In these chemical formulae, Ma denotes at least one of a metal element and a semi-metal element capable of forming an alloy together with lithium; Mb denotes at least one of a metal element and a semi-metal element other than lithium and Ma; Mc denotes at least one of the non-metallic elements; Md denotes at least one of a metal element and a semi-metal element other than Ma; and s, t, u, p, q and r meets $s>0$, $t\geq 0$, $u\geq 0$, $p>0$, $q>0$ and $r\geq 0$.

Further, an inorganic compound not including lithium (Li) such as $MnO_2$, $V_2O_5$, $V_6O_{13}$, NiS, and MoS may be used in the negative electrode.

The above lithium ion battery further includes an electrolyte which may be one or more of a gel electrolyte, a solid electrolyte and an electrolytic solution, and the electrolyte solution includes a lithium salt and a non-aqueous solvent.

The above lithium salt includes at least one selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt selects $LiPF_6$ because it may give high ionic conductivity and improved cycle characteristics.

The above non-aqueous solvent may be a carbonate compound, a carboxylate compound, an ether compound, other organic solvents, or a combination thereof.

In the above non-aqueous solvent, the carbonate compound may be a chain carbonate compound, a cyclic carbonate compound, a fluorocarbonate compound, or a combination thereof. Among them, examples of the chain carbonate compound are diethyl carbonate (DEC), dimethyl carbonate (DMC), dipropyl carbonate (DPC), methylpropyl carbonate (MPC), ethylene propyl carbonate (EPC), methyl ethyl carbonate (MEC) and combinations thereof. Among them, examples of the cyclic carbonate compound are ethylene carbonate (EC), propylene carbonate (PC), butylene carbonate (BC), vinylidene ethylene carbonate (VEC), and combinations thereof. Among them, examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

In the above non-aqueous solvent, examples of the carboxylate compound are methyl acetate, ethyl acetate, n-propyl acetate, t-butyl acetate, methyl propionate, ethyl propionate, γ-butyrolactone, azlactone, valerolactone, mevalonolactone, caprolactone, methyl formate and combinations thereof.

In the above non-aqueous solvent, examples of the ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

In the above non-aqueous solvent, examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate and phosphate, and combinations thereof.

Although the above is exemplified by a lithium ion battery, those skilled in the art can understand that the separator of the present application may be used for other suitable energy storage devices after reading the present application. Such energy storage devices include any devices that generate an electrochemical reaction, and specific examples thereof include all kinds of primary batteries, secondary batteries, fuel batteries, solar batteries, or capacitors. The energy storage device may be fabricated using conventional methods known to those skilled in the art. In one example of the method of fabricating an electrochemical device, the energy storage device inserts the separator of the present application between a positive electrode and a negative electrode to form an electrode assembly, and then injects an electrolyte into the electrode assembly to thus provide an energy storage device. Depending on the method of manufacture and the required properties for the final product, the electrolyte may be injected in a suitable step during the manufacturing process of the energy storage device. In other words, the electrolyte may be injected prior to assembly of the energy storage device or at the final step during assembly of the energy storage device.

Hereinafter, a lithium ion battery is taken as an example and a preparation of the lithium ion battery is described in conjunction with specific examples. Those skilled in the art will understand that the preparation method described in the present application is merely an example, and any other suitable preparation methods are within the scope the present application.

The preparation process of the lithium ion battery of the examples and comparative examples of the present application is as follows:

Example 1

(1) Preparation of the Negative Electrode

A solvent of deionized water and a thickener of carboxymethyl cellulose sodium (CMC) are added to a stirring mill to dissolve completely under vacuum to obtain an aqueous polymer solution; then, a conductive agent of conductive carbon black is added to the aqueous polymer solution, and stirred to be uniform; then a negative electrode material of artificial graphite is added and stirred slowly under vacuum to be uniform; then, a binder of styrene-butadiene rubber is added, and is slowly stirred under vacuum to be uniform to obtain a negative electrode slurry; subsequently, the negative electrode slurry is uniformly coated on both sides of a negative electrode current collector of copper foil, and after drying, a negative electrode material layer is obtained, and then compacted by a roll press, and finally cut and welded with an electrode tab, so as to obtain the negative electrode of the lithium ion battery. Among them, the mass ratio of the negative electrode material, the conductive agent, the binder, and the thickener is 94.5:1.5:2:2.

(2) Preparation of the Positive Electrode

A solvent of N-methylpyrrolidone (NMP) and a binder of polyvinylidene fluoride (PVDF) are added to a stirring mill to dissolve completely under vacuum to obtain a polyvinylidene fluoride solution; then, a conductive agent of conductive carbon black is added to the polyvinylidene fluoride solution, and stirred rapidly to be uniform; then a positive electrode material of lithium cobaltate ($LiCoO_2$) is added and stirred slowly under vacuum to be uniform to obtain a positive electrode slurry; subsequently, the positive electrode slurry is uniformly coated on both sides of a positive electrode current collector of aluminum foil, and compacted by a roll press, and finally cut and welded with an electrode tab, so as to obtain the positive electrode of the lithium ion battery. Among them, the mass ratio of the positive electrode material, the binder and the conductive agent is 92:4:4.

(3) Preparation of Electrolyte

In an argon atmosphere glove box with a water content of <10 ppm, ethylene carbonate (EC), propylene carbonate (PC), and dimethyl carbonate (DEC) are mixed in a volume ratio of EC:PC:DEC=1:1:1, followed by dissolving the fully dried lithium salt $LiPF_6$ in a mixed organic solvent and uniformly mixing to obtain a liquid electrolyte (electrolytic solution), wherein the concentration of $LiPF_6$ is 1 mol/L.

(4) Preparation of Separator A polytetrafluoroethylene (PTFE) and liquid auxiliary paraffin oil are mixed at a weight ratio of 7:3, pre-pressed into a cylindrical blank, and the cylinder blank is made into a 0.25 mm thick sheet by calendering and dried at 200° C. for 6 h to remove the auxiliary; then, the machine direction stretching is performed at 270° C. with the stretching ratio being controlled to about 5 times, and then the transverse direction stretching is performed at 170° C. with the stretching ratio being controlled to about 5 times; subsequently, above stretched membrane is heat-formed at a temperature of 360° C. for 30 min to finally obtain a second porous substrate (polytetrafluoroethylene) having a thickness of 5 μm, wherein the second porous substrate (polytetrafluoroethylene) is an isotropic structure, the tensile strength of the second porous substrate (polytetrafluoroethylene) in the machine direction (MD) and the transverse direction (TD) is 500 $kgf/cm^2$, and the elongation at break thereof in both the machine direction (MD) and the transverse direction (TD) is 400%.

The second porous substrate (polytetrafluoroethylene) obtained above and the first porous substrate (polyethylene) (thickness: 5 μm) are laminated and hot-pressed to form a separator, wherein the hot pressing temperature is controlled at 90° C. and the hot pressing pressure is controlled at 1.0 MPa; the first porous substrate (polyethylene) has a tensile strength of 1000 $kgf/cm^2$ in the machine direction (MD), an elongation at break in the machine direction (MD) of 100%, and a tensile strength in the transverse direction (TD) of 800 $kgf/cm^2$, elongation at break in the transverse direction (TD) is 100%; the peeling force between the second porous substrate (polytetrafluoroethylene) and the first porous substrate (polyethylene) is 5 N/m.

(5) Preparation of Lithium Ion Battery

The positive electrode, the separator and the negative electrode are stacked in order so that the separator is in a role of isolation between the positive electrode and the negative electrode, and then are wound to obtain an electrode assembly; the electrode assembly is placed in a outer packaging foil with aluminum plastic film, and the prepared electrolyte is injected into the dried electrode assembly, and then subjected to processes such as vacuum encapsulation, static crystallization, formation, capacity testing, shaping to obtain a soft packaging lithium ion battery.

Example 2

The preparation process of the lithium ion battery is the same as that in Example 1, except that:

(4) Preparation of Separator

The second porous substrate (polytetrafluoroethylene) and the first porous substrate (polypropylene) are laminated and hot-pressed to form a separator, wherein the thickness of the second porous substrate (polytetrafluoroethylene) is increased to 9 μm, and the thickness of the first porous substrate (polypropylene) is 9 μm; the first porous substrate (polypropylene) has a tensile strength in the machine direction (MD) of 800 $kgf/cm^2$, an elongation at break in the machine direction (MD) of 100%, and a tensile strength in the transverse direction (TD) of 300 $kgf/cm^2$, elongation at break in the transverse direction (TD) is 600%; the peeling force between the second porous substrate (polytetrafluoroethylene) and the first porous substrate (polypropylene) is 5 N/m.

Example 3

The preparation process of the lithium ion battery is the same as that in Example 1, except that:

(4) Preparation of Separator

The first porous substrate (polyethylene) has a tensile strength in the machine direction (MD) of 800 $kgf/cm^2$, an elongation at break in the machine direction (MD) of 500%, and a tensile strength in the transverse direction (TD) of 500 $kgf/cm^2$, elongation at break in the transverse direction (TD) is 100%; the peeling force between the second porous substrate (polytetrafluoroethylene) and the first porous substrate (polyethylene) is 5 N/m.

Example 4

The preparation process of the lithium ion battery is the same as that in Example 1, except that:
(4) Preparation of Separator
The second porous substrate (polytetrafluoroethylene) has a tensile strength of 500 kgf/cm$^2$ in the machine direction (MD) and the transverse direction (TD), and an elongation at break of 800% in the machine direction (MD) and the transverse direction (TD). The peeling force between the second porous substrate (polytetrafluoroethylene) and the first porous substrate (polyethylene) is 5 N/m.

Example 5

The preparation process of the lithium ion battery is the same as that in Example 1, except that:
(4) Preparation of Separator
The second porous substrate (polytetrafluoroethylene) has a tensile strength of 500 kgf/cm$^2$ in the machine direction (MD) and the transverse direction (TD), and an elongation at break of 600% in the machine direction (MD) and the transverse direction (TD). The peeling force between the second porous substrate (polytetrafluoroethylene) and the first porous substrate (polyethylene) is 5 N/m.

Example 6

The preparation process of the lithium ion battery is the same as that in Example 1, except that:
(4) Preparation of Separator
The second porous substrate (polytetrafluoroethylene) has a tensile strength of 500 kgf/cm$^2$ in the machine direction (MD) and the transverse direction (TD), and an elongation at break of 300% in the machine direction (MD) and the transverse direction (TD). The peeling force between the second porous substrate (polytetrafluoroethylene) and the first porous substrate (polyethylene) is 5 N/m.

Example 7

The preparation process of the lithium ion battery is the same as that in Example 1, except that:
(4) Preparation of Separator
The second porous substrate (polytetrafluoroethylene) has a tensile strength of 500 kgf/cm$^2$ in the machine direction (MD) and the transverse direction (TD), and an elongation at break of 105% in the machine direction (MD) and the transverse direction (TD). The peeling force between the second porous substrate (polytetrafluoroethylene) and the first porous substrate (polyethylene) is 5 N/m.

Example 8

The preparation process of the lithium ion battery is the same as that in Example 1, except that:
(4) Preparation of Separator
The second porous substrate (polytetrafluoroethylene) has a tensile strength of 800 kgf/cm$^2$ in the machine direction (MD) and the transverse direction (TD), and an elongation at break of 400% in the machine direction (MD) and the transverse direction (TD). The peeling force between the second porous substrate (polytetrafluoroethylene) and the first porous substrate (polyethylene) is 5 N/m.

Example 9

The preparation process of the lithium ion battery is the same as that in Example 1, except that:
(4) Preparation of Separator
The second porous substrate (polytetrafluoroethylene) has a tensile strength of 600 kgf/cm$^2$ in the machine direction (MD) and the transverse direction (TD), and an elongation at break of 400% in the machine direction (MD) and the transverse direction (TD). The peeling force between the second porous substrate (polytetrafluoroethylene) and the first porous substrate (polyethylene) is 5 N/m.

Example 10

The preparation process of the lithium ion battery is the same as that in Example 1, except that:
(4) Preparation of Separator
The second porous substrate (polytetrafluoroethylene) has a tensile strength of 300 kgf/cm$^2$ in the machine direction (MD) and the transverse direction (TD), and an elongation at break of 400% in the machine direction (MD) and the transverse direction (TD). The peeling force between the second porous substrate (polytetrafluoroethylene) and the first porous substrate (polyethylene) is 5 N/m.

Example 11

The preparation process of the lithium ion battery is the same as that in Example 1, except that:
(4) Preparation of Separator
The second porous substrate (polytetrafluoroethylene) has a tensile strength of 150 kgf/cm$^2$ in the machine direction (MD) and the transverse direction (TD), and an elongation at break of 400% in the machine direction (MD) and the transverse direction (TD). The peeling force between the second porous substrate (polytetrafluoroethylene) and the first porous substrate (polyethylene) is 5 N/m.

Example 12

The preparation process of the lithium ion battery is the same as that in Example 1, except that:
(4) Preparation of Separator
The second porous substrate (polytetrafluoroethylene) has a thickness of 2.5 μm.

Example 13

The preparation process of the lithium ion battery is the same as that in Example 1, except that:
(4) Preparation of Separator
The second porous substrate (polytetrafluoroethylene) has a thickness of 3.3 μm.

Example 14

The preparation process of the lithium ion battery is the same as that in Example 1, except that:
(4) Preparation of Separator
The second porous substrate (polytetrafluoroethylene) has a thickness of 8 μm.

Example 15

The preparation process of the lithium ion battery is the same as that in Example 1, except that:

(4) Preparation of Separator

The second porous substrate (polytetrafluoroethylene) has a thickness of 10 µm.

Example 16

The preparation process of the lithium ion battery is the same as that in Example 1, except that:
(4) Preparation of Separator
The peeling force between the second porous substrate (polytetrafluoroethylene) and the first porous substrate (polyethylene) is 20 N/m.

Example 17

The preparation process of the lithium ion battery is the same as that in Example 1, except that:
(4) Preparation of Separator
The peeling force between the second porous substrate (polytetrafluoroethylene) and the first porous substrate (polyethylene) is ION/m.

Example 18

The preparation process of the lithium ion battery is the same as that in Example 1, except that:
(4) Preparation of Separator
The peeling force between the second porous substrate (polytetrafluoroethylene) and the first porous substrate (polyethylene) is 2 N/m.

Example 19

The preparation process of the lithium ion battery is the same as that in Example 1, except that:
(4) Preparation of Separator
The peeling force between the second porous substrate (polytetrafluoroethylene) and the first porous substrate (polyethylene) is 0.1 N/m.

Example 20

The preparation process of the lithium ion battery is the same as that in Example 1, except that:
(4) Preparation of Separator
A polytetrafluoroethylene (PTFE) and liquid auxiliary paraffin oil are mixed at a weight ratio of 7:3, pre-pressed into a cylindrical blank, and the cylinder blank is made into a 0.25 mm thick sheet by calendering and dried at 200° C. for 6 h to remove the auxiliary; then, the machine stretching is performed at 270° C. with the stretching ratio being controlled to about 5 times, and then the transverse stretching is performed at 170° C. with the stretching ratio being controlled to about 5 times; subsequently, above stretched membrane is heat-formed at a temperature of 360° C. for 30 min to finally obtain a second porous substrate (polytetrafluoroethylene) having a thickness of 5 µm, wherein the second porous substrate (polytetrafluoroethylene) is an isotropic structure, the tensile strength of the second porous substrate (polytetrafluoroethylene) in the machine direction (MD) and the transverse direction (TD) is 500 kgf/cm$^2$, and the elongation at break thereof in the machine direction (MD) and the transverse direction (TD) is 400%.

The binder polyvinylidene fluoride (PVDF), absolute ethanol, and N,N-dimethylformamide (DMF) are added to a mixer at a weight ratio of 10:8:82 and stirred to be uniform to obtain a homogeneous mixture, wherein the stirring speed is 2000 rpm and the stirring time is 60 min; the resulting mixture is uniformly applied on the first porous substrate (polyethylene) and then immersed in a coagulation bath, wherein the applying speed was 30 m/min and the coagulation bath a mixture of water and N,N-dimethylformamide in a volume ratio being water:N,N-dimethylformamide=2:8, to obtain a first porous substrate (polyethylene) having a binder layer applied with polyvinylidene fluoride, in which the thickness of the binder layer of polyvinylidene fluoride is 5 µm. The first porous substrate (polyethylene) has a tensile strength in the machine direction (MD) of 1000 kgf/cm$^2$, an elongation at break in the machine direction (MD) of 100%, and a tensile strength in the transverse direction (TD) of 800 kgf/cm$^2$, elongation at break in the transverse direction (TD) is 100%.

The above-obtained first porous substrate (polyethylene) having a binder layer of polyvinylidene fluoride on its surface and the second porous substrate (polytetrafluoroethylene) are laminated and heat-pressed to obtain a separator with a hot pressing temperature being controlled at 40° C. and a hot pressin pressure being controlled at 0.5 MPa; the peeling force between the second porous substrate (polytetrafluoroethylene) and the first porous substrate (polyethylene) is 5 N/m.

Example 21

The preparation process of the lithium ion battery is the same as that in Example 20, except that:
(4) Preparation of Separator
The binder layer has a thickness of 4 m. The peeling force between the second porous substrate (polytetrafluoroethylene) and the first porous substrate (polyethylene) is 5 N/m.

Example 22

The preparation process of the lithium ion battery is the same as that in Example 20, except that:
(4) Preparation of Separator
The binder layer has a thickness of 3 m. The peeling force between the second porous substrate (polytetrafluoroethylene) and the first porous substrate (polyethylene) is 5 N/m.

Example 23

The preparation process of the lithium ion battery is the same as that in Example 20, except that:
(4) Preparation of Separator
The binder layer has a thickness of 1 m. The peeling force between the second porous substrate (polytetrafluoroethylene) and the first porous substrate (polyethylene) is 5 N/m.

Example 24

The preparation process of the lithium ion battery is the same as that in Example 20, except that:
The binder layer has a thickness of 0.3 µm. The peeling force between the second porous substrate (polytetrafluoroethylene) and the first porous substrate (polyethylene) is 5 N/m.

Example 25

The preparation process of the lithium ion battery is the same as that in Example 20, except that:

(4) Preparation of Separator

Polyacrylic acid is used as the binder, and the binder layer has a thickness of 3 μm. The peeling force between the second porous substrate (polytetrafluoroethylene) and the first porous substrate (polyethylene) is 5 N/m.

Example 26

The preparation process of the lithium ion battery is the same as that in Example 20, except that:

(4) Preparation of Separator

Polytetrafluoroethylene is used as the binder, and the binder layer has a thickness of 3 m. The peeling force between the second porous substrate (polytetrafluoroethylene) and the first porous substrate (polyethylene) is 5 N/m.

Example 27

The preparation process of the lithium ion battery is the same as that in Example 20, except that:

(4) Preparation of Separator

Polyvinylidene fluoride (PVDF) is applied to the surface of the first porous substrate (polyethylene) in a dot-like manner to form an island-shaped discontinuously distributed binder layer between the second porous substrate (polytetrafluoroethylene) and the first porous substrate (polyethylene), and the binder layer has a thickness of 3 μm. The peeling force between the second porous substrate (polytetrafluoroethylene) and the first porous substrate (polyethylene) is 5 N/m.

Example 28

The preparation process of the lithium ion battery is the same as that in Example 20, except that:

(4) Preparation of Separator

The second porous substrate (polytetrafluoroethylene) and the first porous substrate (polyethylene) are bound together by a hot melt adhesive, wherein a TPU hot melt adhesive is used as the hot melt adhesive; the TPU hot melt adhesive is applied to the surface of the first porous substrate (polyethylene) in a dot-like manner to form an island-shaped discontinuously distributed binder layer between the second porous substrate (polytetrafluoroethylene) and the first porous substrate (polyethylene), and the binder layer has a thickness of 3 μm. The peeling force between the second porous substrate (polytetrafluoroethylene) and the first porous substrate (polyethylene) is 5 N/m.

Example 29

The preparation process of the lithium ion battery is the same as that in Example 1, except that:

(4) Preparation of Separator

A polytetrafluoroethylene (PTFE) and liquid auxiliary paraffin oil are mixed at a weight ratio of 7:3, and an inorganic particle $Al_2O_3$ is added for stirring well to disperse evenly, and then pre-pressed into a cylindrical blank, and the cylinder blank is made into a 0.25 mm thick sheet by calendering and dried at a temperature of 200° C. for 6 h to remove the auxiliary; then, the machine stretching is performed at a temperature of 270° C. with the stretching ratio being controlled to about 5 times, and then the transverse stretching is performed at a temperature of 170° C. with the stretching ratio being controlled to about 5 times; subsequently, above stretched membrane is heat-formed at a temperature of 360° C. for 30 min to finally obtain a second porous substrate (including polytetrafluoroethylene and alumina) having a thickness of 5 μm, wherein the second porous substrate (including polytetrafluoroethylene and alumina) is an isotropic structure, the tensile strength of the second porous substrate (including polytetrafluoroethylene and alumina) in the machine direction (MD) and the transverse direction (TD) is 500 kgf/cm$^2$, and the elongation at break thereof in the machine direction (MD) and the transverse direction (TD) is 400%; the content of the $Al_2O_3$ particle is 10% of the total weight of the second porous substrate (polytetrafluoroethylene).

The binder polyvinylidene fluoride (PVDF), absolute ethanol, and N,N-dimethylformamide (DMF) are added to a mixer at a weight ratio of 10:8:82 and stirred to be uniform to obtain a homogeneous mixture, wherein the stirring speed is 2000 rpm and the stirring time is 60 min; the resulting mixture is uniformly applied on the first porous substrate (polyethylene) and then immersed in a coagulation bath, wherein the applying speed was 30 m/min and the coagulation bath a mixture of water and N,N-dimethylformamide in a volume ratio being water:N,N-dimethylformamide=2:8, to obtain a first porous substrate (polyethylene) applied with a binder layer of polyvinylidene fluoride, in which the thickness of the binder layer of polyvinylidene fluoride is 3 μm. The first porous substrate (polyethylene) has a tensile strength of 1000 kgf/cm$^2$ in the machine direction (MD), an elongation at break in the machine direction (MD) of 100%, and a tensile strength in the transverse direction (TD) of 800 kgf/cm$^2$, elongation at break in the transverse direction (TD) is 100%.

The above-obtained second porous substrate (polytetrafluoroethylene) containing particles and the first porous substrate (polyethylene, thickness: 5 μm) are laminated and heat-pressed to obtain a separator, wherein the hot pressing temperature being controlled at 90° C. and the hot pressing pressure being controlled at 1.0 MPa; the peeling force between the second porous substrate (polytetrafluoroethylene) containing $Al_2O_3$ particle and the first porous substrate (polyethylene) applied with the binder layer of polyvinylidene fluoride is 5 N/m.

Example 30

The preparation process of the lithium ion battery is the same as that in Example 1, except that:

(4) Preparation of Separator

A polytetrafluoroethylene (PTFE) and liquid auxiliary paraffin oil are mixed at a weight ratio of 7:3, and an inorganic particle $Mg(OH)_2$ is added for stirring well to disperse evenly, and then pre-pressed into a cylindrical blank, and the cylinder blank is made into a 0.25 mm thick sheet by calendering and dried at a temperature of 200° C. for 6 h to remove the auxiliary; then, the machine stretching is performed at a temperature of 270° C. with the stretching ratio being controlled to 5 times, and then the transverse stretching is performed at a temperature of 170° C. with the stretching ratio being controlled to 5 times; subsequently, above stretched membrane is heat-formed at a temperature of 360° C. for 30 min to finally obtain a second porous substrate (including polytetrafluoroethylene and magnesium hydroxide) having a thickness of 5 μm, wherein the second porous substrate (including polytetrafluoroethylene and magnesium hydroxide) is an isotropic structure, the tensile strength of the second porous substrate (including polytetrafluoroethylene and magnesium hydroxide) in the machine direction (MD) and the transverse direction (TD) is 500 kgf/cm$^2$, and the elongation at break thereof in the machine direction (MD) and the transverse direction (TD) is 400%; the content of the Mg(OH)$_2$ particle is 10% of the total weight of the second porous substrate (polytetrafluoroethylene).

The binder polyvinylidene fluoride (PVDF), absolute ethanol, and N,N-dimethylformamide (DMF) are added to a mixer at a weight ratio of 10:8:82 and stirred to be uniform to obtain a homogeneous mixture, wherein the stirring speed is 2000 rpm and the stirring time is 60 min; the resulting mixture is uniformly applied on the first porous substrate (polyethylene) and then immersed in a coagulation bath, wherein the applying speed was 30 m/min and the coagulation bath a mixture of water and N,N-dimethylformamide in a volume ratio being water:N,N-dimethylformamide=2:8, to obtain a first porous substrate (polyethylene) applied with a binder layer of polyvinylidene fluoride, in which the thickness of the binder layer of polyvinylidene fluoride is 3 μm. The first porous substrate (polyethylene) has a tensile strength in the machine direction (MD) of 1000 kgf/cm$^2$, an elongation at break in the machine direction (MD) of 100%, and a tensile strength in the transverse direction (TD) of 800 kgf/cm$^2$, elongation at break in the transverse direction (TD) is 100%.

The above-obtained second porous substrate (polytetrafluoroethylene) containing Mg(OH)$_2$ particle and the first porous substrate (polyethylene, thickness: 5 μm) are laminated and heat-pressed to obtain a separator, wherein the hot pressing temperature being controlled at 90° C. and the hot pressing pressure being controlled at 1.0 MPa; the peeling force between the second porous substrate (polytetrafluoroethylene) containing Mg(OH)$_2$ particle and the first porous substrate (polyethylene) applied with the binder layer of polyvinylidene fluoride is 5 N/m.

Example 31

The preparation process of the lithium ion battery is the same as that in Example 1, except that:
(4) Preparation of Separator
The polyvinylidene fluoride (PVDF), absolute ethanol, and N,N-dimethylacetamide (DMAc) are added to a mixer at a weight ratio of 10:10:80 and stirred to be uniform to obtain a homogeneous mixture, wherein the stirring speed is 2000 rpm and the stirring time is 60 min; the resulting mixture is uniformly applied on a polyethylene terephthalate (PET) release coil and then immersed in a coagulation bath, wherein the applying speed was 30 m/min and the coagulation bath a mixture of water and N,N-dimethylformamide in a volume ratio being water:N,N-dimethylformamide=2:8, the polyvinylidene fluoride and the polyethylene terephthalate release coil are peeled off to obtain a second porous substrate (polyvinylidene fluoride) with a thickness of, in which the second porous substrate (polyvinylidene fluoride) is an isotropic structure, the tensile strength of the second porous substrate (polyvinylidene fluoride) in the machine direction (MD) and the transverse direction (TD) is 500 kgf/cm$^2$, and the elongation at break in the machine direction (MD) and the transverse direction (TD) is 400%.

The binder polyvinylidene fluoride (PVDF), absolute ethanol, and N,N-dimethylformamide (DMF) are added to a mixer at a weight ratio of 10:8:82 and stirred to be uniform to obtain a homogeneous mixture, wherein the stirring speed is 2000 rpm and the stirring time is 60 min; the resulting mixture is uniformly applied on the first porous substrate (polyethylene) and then immersed in a coagulation bath, wherein the applying speed was 30 m/min and the coagulation bath a mixture of water and N,N-dimethylformamide in a volume ratio being water:N,N-dimethylformamide=2:8, to obtain a first porous substrate (polyethylene) having a binder layer of polyvinylidene fluoride on its surface. Among them, the binder layer of polyvinylidene fluoride has a thickness of 3 μm. The first porous substrate (polyethylene) has a tensile strength in the machine direction (MD) of 1000 kgf/cm$^2$, an elongation at break in the machine direction (MD) of 100%, and a tensile strength in the transverse direction (TD) of 800 kgf/cm$^2$, elongation at break in the transverse direction (TD) is 100%.

The above-obtained first porous substrate (polyethylene) having a binder layer of polyvinylidene fluoride on its surface and the second porous substrate (polyvinylidene fluoride) are laminated and heat-pressed to obtain a separator with a hot pressing temperature being controlled at 40° C. and a hot pressin pressure being controlled at 0.5 MPa; the peeling force between the second porous substrate (polyvinylidene fluoride) and the first porous substrate (polyethylene) is 5 N/m.

Comparative Example 1

The preparation process of the lithium ion battery is the same as that in Example 1, except that:
(4) Preparation of Separator
The separator includes only the first porous substrate, and the first porous substrate is made of polypropylene. The first porous substrate (polypropylene) has a thickness of 9 μm, and the first porous substrate (polypropylene) has a tensile strength in the machine direction (MD) of 800 kgf/cm$^2$, an elongation at break in the machine direction (MD) of 100%, and a tensile strength in the transverse direction (TD) of 300 kgf/cm$^2$, elongation at break in the transverse direction (TD) is 600%.

Comparative Example 2

The preparation process of the lithium ion battery is the same as that in Example 1, except that:
(4) Preparation of Separator
The separator includes only the first porous substrate, and the first porous substrate is made of polyethylene. The first porous substrate (polyethylene) has a thickness of 5 μm, and the first porous substrate (polyethylene) has a tensile strength in the machine direction (MD) of 1000 kgf/cm$^2$, an elongation at break in the machine direction (MD) of 100%, and a tensile strength in the transverse direction (TD) of 800 kgf/cm$^2$, elongation at break in the transverse direction (TD) is 100%.

Comparative Example 3

The preparation process of the lithium ion battery is the same as that in Example 1, except that:
(4) Preparation of Separator
The binder polyvinylidene fluoride, absolute ethanol, and N,N-dimethylformamide are added to a mixer at a weight ratio of 10:8:82 and stirred to be uniform to obtain a homogeneous mixture, wherein the stirring speed is 2000 rpm and the stirring time is 60 min; the resulting mixture is uniformly applied on the first porous substrate (polyethylene) and then immersed in a coagulation bath with an applying speed of 30 m/min and the coagulation bath being a mixture of water and N,N-dimethylformamide in a volume ratio of water:N,N-dimethylformamide=2:8, to obtain a first porous substrate (polyethylene) having a binder layer of polyvinylidene fluoride on its surface, which is then used as the separator of the lithium ion battery. The binder layer of polyvinylidene fluoride has a thickness of 5 µm. The first porous substrate (polyethylene) has a thickness of 5 µm, and the first porous substrate (polyethylene) has a tensile strength in the machine direction (MD) of 1000 kgf/cm², an elongation at break in the machine direction (MD) of 100%, and a tensile strength in the transverse direction (TD) of 800 kgf/cm², elongation at break in the transverse direction (TD) is 100%.

Comparative Example 4

The preparation process of the lithium ion battery is the same as that in Example 1, except that:

(4) Preparation of Separator

The separator includes only the second porous substrate, and the second porous substrate is made of polytetrafluoroethylene. The second porous substrate (polytetrafluoroethylene) has a thickness of 5 µm, and the second porous substrate (polytetrafluoroethylene) has a tensile strength in the machine direction (MD) of 500 kgf/cm², an elongation at break in the machine direction (MD) of 400%, and a tensile strength in the transverse direction (TD) of 500 kgf/cm², elongation at break in the transverse direction (TD) is 400%.

Next, the test process of the lithium ion battery will be described.

(1) Test for the elongation at break and tensile strength of separator

First, the separator is cut into a sample having a width (W) of 14.5 mm and a length (L) of 100 mm in the machine direction (MD) and the transverse direction (TD), respectively, then the separator sample is stretched at a constant rate (v) of 50 mm/min and a clamping distance of 40 mm (S1) using a high-speed tensile machine, and the tensile length (S2) and tensile strength (M) of the machine direction (MD) and transverse direction (TD) fractures of the separator sample are recorded separately, and then the elongation at break (EB) of the separator in the machine direction (MD) and the transverse direction (TD) is calculated, wherein the elongation at break is calculated as:

$$EB = \frac{S2 - S1}{S1}$$

and 10 samples of the separator are taken for testing in each group.

(2) Test for Heat Resistance Performance of Separator

The separator is cut into a separator sample with a length of 72.5 mm and a width of 54.2 mm in the machine direction (MD) and the transverse direction (TD), respectively, and then the separator sample is placed at 110° C. for 1 h, and finally the length L and width W of the separator sample placed after 1 h are recorded, while calculating the heat shrinkage rate; the calculation formula for heat shrinkage is:

$$\text{heat shrinkage in machine direction} = 1 - \frac{L}{72.5},$$

$$\text{heat shrinkage in transverse direction is } 1 - \frac{W}{54.2},$$

and 5 separator samples were taken from each group.

(3) Test for Peeling Force

Taking a separator to be tested, a blade is used to cut the separator into a sample having a width of 30 mm*length of 100 mm, then one side of the NITTO 5000NS double-sided tape is adhered to a steel plate having a width of 30 mm*length of 200 mm, wherein the double-sided tape has a width of 20 mm*length of 90 mm; one side of the sample of the cut separator is adhered to the other side of the double-sided tape; a paper tape having a width equal to the width of the separator and having a length of 120 mm is bound to the other side of the sample of the separator by a wrinkle gel; the first substrate and the second substrate are torn at the beginning of the peeling for the separator sample, then the paper tape is folded up and fixed with a fixture, followed by using a high-speed rail AI-3000 tensile machine to test the peeling force between the first substrate and the second substrate of the separator sample with a peeling angle of 180°, a peeling speed of 50 mm/min and a peeling displacement of 50 mm; the peeling force is calculated by taking the tensile value f when the curve is flat and the displacement is greater than 10 mm, wherein F=f*g(9.8 N/kg)/0.02 (width of the double-sided tape) with the unit of N/m.

(4) Test for Impact of Lithium Ion Battery

The lithium ion battery is charged at a constant current of 0.5 C to a voltage of 4.3 V at 25° C., and then charged at a constant voltage of 4.3 V to a current of 0.05 C. The UL1642 test standard is used, wherein the mass of the hammer is 9.8 kg with a diameter of 15.8 mm, a drop height of 61±2.5 cm, to perform a heavy impact test on the lithium ion battery. If the lithium ion battery does not explode, ignite, smoke, it is defined as "Pass", and 100 lithium-ion batteries are tested in each group. Then the pass rate of the impact test for the lithium ion battery is calculated.

(5) Nail Test for Lithium Ion Battery

The lithium ion battery is charged at a constant current of 0.5 C to a voltage of 4.3 V at 25° C., then charged at a constant voltage of 4.3 V to a current of 0.05 C, and then subjected to nail test on the lithium ion battery, wherein the nailing rate is 100 mm/s, the steel nail diameter is 4 mm, and the retention is 300 s. If the lithium ion battery does not explode, ignite, smoke, it is defined as "Pass", and 100 lithium-ion batteries are tested per group. Then the pass rate of the nail test for the lithium ion battery is calculated.

(6) Test for Side Impact of Lithium Ion Battery

The lithium ion battery is charged at a constant current of 0.5 C to a voltage of 4.3 V at 25° C., and then charged at a constant voltage of 4.3 V to a current of 0.05 C. The UL1642 test standard is used, wherein the side impact force is 13 kN, to perform a side impact test on the lithium ion battery. If the lithium ion battery does not explode, ignite, smoke, it is defined as "Pass", and 100 lithium-ion batteries are tested in each group. Then the pass rate of the side impact test for the lithium ion battery is calculated.

Table 1 shows the specific parameters of Examples 1-31 and Comparative Examples 1-4.

TABLE 1

| | first porous substrate | | | | | first porous substrate | | | | | binder layer | | | |
|---|---|---|---|---|---|---|---|---|---|---|---|---|---|---|
| | | elongation at break % | | tensile strength kgf/cm² | | thick-ness | | elongation at break % | | tensile strength kgf/cm² | | thick-ness | | | | | peeling force |
| | varieties | MD | TD | MD | TD | μm | varieties | MD | TD | MD | TD | μm | type of binder | appli-cation manner | thick-ness μm | peeling force N/m |
| Example 1 | PE | 100 | 100 | 1000 | 800 | 5 | PTFE | 400 | 400 | 500 | 500 | 5 | / | / | / | 5 |
| Example 2 | PP | 100 | 600 | 800 | 300 | 9 | PTFE | 400 | 400 | 500 | 500 | 9 | / | / | / | 5 |
| Example 3 | PE | 500 | 100 | 800 | 500 | 5 | PTFE | 400 | 400 | 500 | 500 | 5 | / | / | / | 5 |
| Example 4 | PE | 100 | 100 | 1000 | 800 | 5 | PTFE | 800 | 800 | 500 | 500 | 5 | / | / | / | 5 |
| Example 5 | PE | 100 | 100 | 1000 | 800 | 5 | PTFE | 600 | 600 | 500 | 500 | 5 | / | / | / | 5 |
| Example 1 | PE | 100 | 100 | 1000 | 800 | 5 | PTFE | 400 | 400 | 500 | 500 | 5 | / | / | / | 5 |
| Example 6 | PE | 100 | 100 | 1000 | 800 | 5 | PTFE | 300 | 300 | 500 | 500 | 5 | / | / | / | 5 |
| Example 7 | PE | 100 | 100 | 1000 | 800 | 5 | PTFE | 105 | 105 | 500 | 500 | 5 | / | / | / | 5 |
| Example 8 | PE | 100 | 100 | 1000 | 800 | 5 | PTFE | 400 | 400 | 800 | 800 | 5 | / | / | / | 5 |
| Example 9 | PE | 100 | 100 | 1000 | 800 | 5 | PTFE | 400 | 400 | 600 | 600 | 5 | / | / | / | 5 |
| Example 10 | PE | 100 | 100 | 1000 | 800 | 5 | PTFE | 400 | 400 | 300 | 300 | 5 | / | / | / | 5 |
| Example 11 | PE | 100 | 100 | 1000 | 800 | 5 | PTFE | 400 | 400 | 150 | 150 | 5 | / | / | / | 5 |
| Example 12 | PE | 100 | 100 | 1000 | 800 | 5 | PTFE | 400 | 400 | 500 | 500 | 2.5 | / | / | / | 5 |
| Example 13 | PE | 100 | 100 | 1000 | 800 | 5 | PTFE | 400 | 400 | 500 | 500 | 3.3 | / | / | / | 5 |
| Example 14 | PE | 100 | 100 | 1000 | 800 | 5 | PTFE | 400 | 400 | 500 | 500 | 8 | / | / | / | 5 |
| Example 15 | PE | 100 | 100 | 1000 | 800 | 5 | PTFE | 400 | 400 | 500 | 500 | 10 | / | / | / | 5 |
| Example 16 | PE | 100 | 100 | 1000 | 800 | 5 | PTFE | 400 | 400 | 500 | 500 | 5 | / | / | / | 20 |
| Example 17 | PE | 100 | 100 | 1000 | 800 | 5 | PTFE | 400 | 400 | 500 | 500 | 5 | / | / | / | 10 |
| Example 18 | PE | 100 | 100 | 1000 | 800 | 5 | PTFE | 400 | 400 | 500 | 500 | 5 | / | / | / | 2 |
| Example 19 | PE | 100 | 100 | 1000 | 800 | 5 | PTFE | 400 | 400 | 500 | 500 | 5 | / | / | / | 0.1 |
| Example 20 | PE | 100 | 100 | 1000 | 800 | 5 | PTFE | 400 | 400 | 500 | 500 | 5 | PVDF | layered | 5 | 5 |
| Example 21 | PE | 100 | 100 | 1000 | 800 | 5 | PTFE | 400 | 400 | 500 | 500 | 5 | PVDF | layered | 4 | 5 |
| Example 22 | PE | 100 | 100 | 1000 | 800 | 5 | PTFE | 400 | 400 | 500 | 500 | 5 | PVDF | layered | 3 | 5 |
| Example 23 | PE | 100 | 100 | 1000 | 800 | 5 | PTFE | 400 | 400 | 500 | 500 | 5 | PVDF | layered | 1 | 5 |
| Example 24 | PE | 100 | 100 | 1000 | 800 | 5 | PTFE | 400 | 400 | 500 | 500 | 5 | PVDF | layered | 0.3 | 5 |
| Example 22 | PE | 100 | 100 | 1000 | 800 | 5 | PTFE | 400 | 400 | 500 | 500 | 5 | PVDF | layered | 3 | 5 |
| Example 15 | PE | 100 | 100 | 1000 | 800 | 5 | PTFE | 400 | 400 | 500 | 500 | 5 | poly-acrylate | layered | 3 | 5 |
| Example 26 | PE | 100 | 100 | 1000 | 800 | 5 | PTFE | 400 | 400 | 500 | 500 | 5 | polytetra-fluoro-ethylene | layered | 3 | 5 |
| Example 27 | PE | 100 | 100 | 1000 | 800 | 5 | PTFE | 400 | 400 | 500 | 500 | 5 | PVDF | dot-like | 3 | 5 |
| Example 28 | PE | 100 | 100 | 1000 | 800 | 5 | PTFE | 400 | 400 | 500 | 500 | 5 | TPU heat melt adhesive | dot-like | 3 | 5 |
| Example 29 | PE | 100 | 100 | 1000 | 800 | 5 | PTFE + Al$_2$O$_3$ | 400 | 400 | 500 | 500 | 5 | PVDF | layered | 3 | 5 |
| Example 30 | PE | 100 | 100 | 1000 | 800 | 5 | PTFE + Mg(OH)$_2$ | 400 | 400 | 500 | 500 | 5 | PVDF | layered | 3 | 5 |
| Example 31 | PE | 100 | 100 | 1000 | 800 | 5 | PVDF | 400 | 400 | 500 | 500 | 5 | PVDF | layered | 3 | 5 |

TABLE 1-continued

| | first porous substrate | | | | | | first porous substrate | | | | | | binder layer | | | |
|---|---|---|---|---|---|---|---|---|---|---|---|---|---|---|---|---|
| | | tensile | | | | | | tensile | | | | | | | | |
| | | elongation at break % | | strength kgf/cm² | | thick-ness | | elongation at break % | | strength kgf/cm² | | thick-ness | type of | appli-cation | thick-ness | peeling force |
| | varieties | MD | TD | MD | TD | μm | varieties | MD | TD | MD | TD | μm | binder | manner | μm | N/m |
| Comparative Example 1 | PP | 100 | 600 | 800 | 300 | 9 | / | / | / | / | / | / | / | / | / | / |
| Comparative Example 2 | PE | 100 | 100 | 1000 | 800 | 5 | / | / | / | / | / | / | / | / | / | / |
| Comparative Example 3 | PE | 100 | 100 | 1000 | 800 | 5 | / | / | / | / | / | / | PVDF | layered | 5 | / |
| Comparative Example 4 | / | / | / | / | / | / | PTFE | 400 | 400 | 500 | 500 | 5 | / | / | / | / |

Table 2 shows the results of performance test for the separators and lithium ion batteries of Examples 1-31 and Comparative Examples 1-4:

TABLE 2

| | separator | | | | | | | | |
|---|---|---|---|---|---|---|---|---|---|
| | tensile strength kgf/cm² | | elongation at break % | | heat shrinkage % | | safety test pass rate % | | |
| | | | | | | | impact test | nail test | test for side impact |
| | MD | TD | MD | TD | MD | TD | | | |
| Example 1 | 800 | 700 | 380 | 380 | 2.4 | 0.8 | 85 | 90 | 90 |
| Example 2 | 700 | 400 | 350 | 450 | 2.2 | 0.9 | 85 | 80 | 85 |
| Example 3 | 700 | 500 | 430 | 350 | 2.3 | 0.9 | 80 | 85 | 80 |
| Example 4 | 800 | 700 | 600 | 600 | 2.5 | 0.8 | 95 | 92 | 92 |
| Example 5 | 800 | 700 | 500 | 500 | 2.4 | 0.8 | 92 | 90 | 92 |
| Example 1 | 800 | 700 | 380 | 380 | 2.4 | 0.8 | 85 | 90 | 90 |
| Example 6 | 800 | 700 | 250 | 250 | 2.3 | 0.7 | 80 | 75 | 72 |
| Example 7 | 800 | 700 | 103 | 103 | 2.4 | 0.8 | 50 | 40 | 55 |
| Example 8 | 900 | 800 | 350 | 350 | 2.1 | 1.0 | 82 | 87 | 85 |
| Example 9 | 700 | 710 | 350 | 350 | 2.1 | 1.0 | 80 | 80 | 82 |
| Example 10 | 600 | 500 | 350 | 350 | 2.2 | 1.1 | 80 | 78 | 83 |
| Example 11 | 500 | 400 | 350 | 350 | 2.2 | 1.0 | 79 | 75 | 80 |
| Example 12 | 800 | 700 | 300 | 300 | 2.0 | 0.8 | 79 | 75 | 82 |
| Example 13 | 700 | 650 | 350 | 350 | 2.1 | 0.8 | 80 | 80 | 85 |
| Example 14 | 600 | 590 | 370 | 370 | 2.2 | 0.9 | 82 | 81 | 86 |
| Example 15 | 590 | 570 | 380 | 380 | 2.2 | 0.9 | 85 | 80 | 87 |
| Example 16 | 700 | 600 | 200 | 200 | 1.3 | 0.8 | 70 | 65 | 68 |
| Example 17 | 850 | 700 | 250 | 250 | 1.3 | 0.9 | 86 | 85 | 83 |
| Example 18 | 800 | 700 | 350 | 350 | 1.4 | 0.9 | 82 | 83 | 85 |
| Example 19 | 600 | 550 | 300 | 300 | 1.4 | 0.8 | 76 | 79 | 82 |
| Example 20 | 750 | 650 | 200 | 200 | 1.4 | 0.7 | 60 | 55 | 60 |
| Example 21 | 800 | 700 | 250 | 250 | 1.4 | 0.8 | 65 | 55 | 60 |
| Example 22 | 800 | 700 | 280 | 280 | 1.3 | 0.7 | 67 | 58 | 63 |
| Example 23 | 850 | 750 | 350 | 350 | 1.4 | 0.8 | 70 | 60 | 72 |
| Example 24 | 850 | 750 | 350 | 350 | 1.4 | 0.8 | 75 | 60 | 70 |
| Example 22 | 800 | 700 | 280 | 280 | 1.3 | 0.7 | 67 | 58 | 63 |
| Example 25 | 800 | 700 | 280 | 280 | 1.3 | 0.8 | 79 | 76 | 75 |
| Example 26 | 800 | 700 | 280 | 280 | 1.3 | 0.7 | 80 | 75 | 78 |
| Example 27 | 550 | 550 | 380 | 380 | 1.4 | 0.7 | 90 | 90 | 95 |
| Example 28 | 550 | 550 | 380 | 380 | 1.4 | 0.7 | 95 | 90 | 90 |
| Example 29 | 800 | 700 | 250 | 250 | 1.2 | 0.6 | 95 | 80 | 78 |
| Example 30 | 800 | 700 | 260 | 260 | 1.0 | 0.6 | 96 | 85 | 82 |
| Example 31 | 800 | 700 | 300 | 300 | 1.8 | 0.9 | 85 | 75 | 80 |
| Comparative Example 1 | 800 | 300 | 100 | 600 | 3.9 | 1.8 | 20 | 20 | 20 |
| Comparative Example 2 | 1000 | 800 | 100 | 100 | 3.8 | 1.6 | 25 | 15 | 20 |

TABLE 2-continued

| | separator | | | | | | safety test pass rate % | | |
|---|---|---|---|---|---|---|---|---|---|
| | tensile strength kgf/cm² | | elongation at break % | | heat shrinkage % | | impact test | nail test | test for side impact |
| | MD | TD | MD | TD | MD | TD | | | |
| Comparative Example 3 | 1000 | 800 | 100 | 100 | 3.5 | 1.6 | 30 | 20 | 25 |
| Comparative Example 4 | 500 | 500 | 400 | 400 | 4.2 | 2.8 | 10 | 10 | 5 |

By comparing Example 1 with Comparative Example 2, Example 2 with Comparative Example 1, and Example 20 and Comparative Example 3, it is known that arranging the second porous substrate on the surface of the first porous substrate, wherein the elongation at break of the second porous substrate in the machine direction and/or transverse direction is greater than the elongation at break in corresponding machine direction and/or transverse direction of the first porous substrate, may significantly increase the elongation at break of the separator in the machine direction and/or transverse direction, significantly reduce the heat shrinkage, and significantly improve the pass rate of the impact test, the nail test, and the side impact test for the lithium ion battery.

By comparing Example 1 and Comparative Example 4, it is understood that with respect to the separator which does not include the first porous substrate, the separator including the first porous substrate of Example 1 has a higher tensile strength in the machine and transverse directions, the heat shrinkage is significantly reduced, and the pass rate of the impact test, the nail test and the side impact test for the lithium ion battery is significantly improved.

By comparing Examples 1-3, it is known that the elongation at break of the second porous substrate in at least one direction of the machine direction and transverse direction is greater than the elongation at break in corresponding machine direction and transverse direction of the first porous substrate, the elongation at break of the separator in the transverse and machine directions is significantly increased, the heat shrinkage is significantly reduced, and the pass rate of the impact test, the nail test and the side impact test for the lithium ion battery is significantly improved.

By comparing Examples 1 and 4-7 it is known that as the elongation at break of the second porous substrate increases in the transverse direction and the machine direction, the elongation at break of the separator in the transverse direction and the machine direction also gradually increases while the tensile strength and the heat shrinkage remaining unchanged, and the pass rate of the impact test, the nail test and the side impact test for the lithium ion battery is gradually increased.

By comparing Examples 8-11 it is known that as the tensile strength of the second porous substrate increases in the transverse direction and the machine direction, the tensile strength of the separator in the transverse direction and the machine direction also gradually increases while the elongation at break of the separator in the transverse and machine directions, the heat shrinkage of the lithium ion battery and the pass rate of the impact test and the side impact test remaining substantially unchanged, and the pass rate of the nail test for the lithium ion battery has an increasing trend.

By comparing Examples 12-15 it is understood that as the ratio of thickness of the first porous substrate to the thickness of the second porous substrate increases, that is, from about 1:2 to 2:1, the tensile strength of the separator in the machine and transverse directions is gradually reduced, the elongation at break of the separator in the transverse and machine directions, the pass rate of the impact test, the nail test and the side impact test for the lithium ion battery shows an increasing trend while the heat shrinkage of the separator remaining substantially unchanged.

By comparing Examples 16-19 it is understood that as the peeling force between the first porous substrate and the second porous substrate decreases, the tensile strength and elongation at break of the separator in the machine and transverse directions, and the pass rate of the impact test, the nail test and the side impact test for the lithium ion battery show a trend of increasing first and then decreasing while the heat shrinkage of the separator remaining substantially unchanged.

By comparing Examples 20-24 it is understood that as the thickness of the binder layer reduces, the tensile strength and elongation at break of the separator in the machine and transverse directions, and the pass rate of the impact test, the nail test and the side impact test for the lithium ion battery show an increasing trend while the heat shrinkage of the separator remaining substantially unchanged.

By comparing Examples 22 and 25-26 it is understood that when different types of the binder layer are used, the tensile strength, elongation at break in the transverse and machine directions and heat shrinkage of the separator are substantially-unchanged, and the pass rate of the impact test, the nail test and the side impact test for the lithium ion battery are affected slightly.

By comparing Examples 27-28 it is understood that when different application manners for the binder layer are adopted, the tensile strength, elongation at break in the transverse and machine directions and heat shrinkage of the separator are unchanged, and the pass rate of the impact test, the nail test and the side impact test for the lithium ion battery are affected slightly.

By comparing Examples 27 and 29, 30 it is known that the inclusion of inorganic particles in the second porous substrate is advantageous for reducing the heat shrinkage of the separator, and the tensile strength of the separator in the transverse direction and the machine direction is increased, the elongation at break of the separator in the transverse direction and the machine direction is decreased, the pass rate of the impact test for the lithium ion battery is increased, and the nail test and the side impact test for the lithium ion battery is reduced.

By comparing Examples 29 and 31 it is understood that the difference in the material type of the second porous substrate may also exert a certain influence on the elongation at break in the transverse and machine directions and heat shrinkage of the separator, and the pass rate of the impact test, the nail test and the side impact test for the lithium ion battery while the tensile strength of the separator in the transverse and machine directions remaining unchanged.

It can be seen from the above that the composite structure of the first porous substrate and the second porous substrate of the present application may simultaneously make the separator retain the advantage of the high tensile strength of the first porous substrate and the high elongation at break of the second porous substrate. Therefore, when the lithium ion battery is subjected to impact, impact and nail tests, the separator may be deformed greatly with the action of external force while exhibiting excellent ductility. At the same time, it may maintain high tensile strength and excellent heat resistance. Thus, the direct contact between the positive and negative electrodes caused by the brittle tear and the heat shrinkage of the separator may be prevented, thereby further protecting the energy storage device such as the lithium ion battery and improving the safety performance of the energy storage device such as the lithium ion battery.

Those skilled in the art will appreciate that the above-described examples are merely exemplary examples and are not to be construed as limiting the present application, and various changes, substitutions and changes may be made without departing from the spirit and scope of the present application.

What is claimed is:

1. A battery separator, comprising:
a first porous substrate; and
a second porous substrate arranged on at least one surface of the first porous substrate; wherein,
an elongation at a break of the second porous substrate is greater than an elongation at a break of the first porous substrate in at least one of a machine direction or a transverse direction of the battery separator; and
the first porous substrate comprises one or more selected from the group consisting of polypropylene, polyethylene, polyethylene terephthalate, polyimide, and polyphthalaldehyde phenyl diamine.

2. The battery separator according to claim 1, wherein the elongation at the break of the second porous substrate is 105% to 800% in the machine direction and the transverse direction.

3. The battery separator according to claim 1, wherein a ratio of thickness of the first porous substrate to the second porous substrate is 1:2 to 3:2.

4. The battery separator according to claim 1, wherein the second porous substrate has a tensile strength ranging from 150 kgf/cm$^2$ to 800 kgf/cm$^2$ in each of the machine direction and the transverse direction.

5. The battery separator according to claim 1, wherein the second porous substrate comprises one or more selected from the group consisting of polyvinylidene fluoride, polytetrafluoroethylene, and polyurethane.

6. The battery separator according to claim 1, wherein the second porous substrate further comprises an inorganic particle, and the inorganic particle is one or more selected from the group consisting of alumina, silica, magnesia, titania, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate.

7. The battery separator according to claim 1, further comprising a binder layer disposed between the first porous substrate and the second porous substrate.

8. The battery separator according to claim 7, wherein the binder layer comprises a binder selected from one or more of polyvinylidene fluoride, polytetrafluoroethylene, polyacrylate, carboxymethyl cellulose sodium, styrene butadiene rubber, or polyurethane.

9. The battery separator according to claim 7, wherein the binder layer comprises a hot melt adhesive selected from one or more of a TPU hot melt adhesive, an EVA hot melt adhesive, or a butyl sealant.

10. The battery separator according to claim 1, wherein a peeling force between the first porous substrate and the second porous substrate is 0.1 N/m to 20 N/m.

11. An energy storage device, comprising a battery separator, wherein the battery separator comprises:
a first porous substrate; and
a second porous substrate arranged on at least one surface of the first porous substrate; wherein,
an elongation at a break of the second porous substrate is greater than an elongation at a break of the first porous substrate in at least one of a machine direction or a transverse direction of the battery separator; and
the first porous substrate comprises one or more selected from the group consisting of polypropylene, polyethylene, polyethylene terephthalate, polyimide, and polyphthalaldehyde phenyl diamine.

12. The energy storage device according to claim 11, wherein the elongation at the break of the second porous substrate is 105% to 800% in the machine direction and the transverse direction.

13. The energy storage device according to claim 11, wherein a ratio of thickness of the first porous substrate to the second porous substrate is 1:2 to 3:2.

14. The energy storage device according to claim 11, wherein the second porous substrate has a tensile strength ranging from 150 kgf/cm$^2$ to 800 kgf/cm$^2$ in each of the machine direction and the transverse direction.

15. The energy storage device according to claim 11, wherein the the second porous substrate comprises one or more selected from the group consisting of polyvinylidene fluoride, polytetrafluoroethylene, and polyurethane, the second porous substrate further comprises an inorganic particle, and the inorganic particle is one or more selected from the group consisting of alumina, silica, magnesia, titania, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate.

16. The energy storage device according to claim 11, further comprising a binder layer disposed between the first porous substrate and the second porous substrate, the binder layer comprises a binder selected from one or more of polyvinylidene fluoride, polytetrafluoroethylene, polyacrylate, carboxymethyl cellulose sodium, styrene butadiene rubber, or polyurethane.

17. The energy storage device according to claim 11, further comprising a binder layer disposed between the first porous substrate and the second porous substrate, the binder layer comprises a hot melt adhesive selected from one or more of a TPU hot melt adhesive, an EVA hot melt adhesive, or a butyl sealant.

18. The energy storage device according to claim 11, wherein a peeling force between the first porous substrate and the second porous substrate is 0.1 N/m to 20 N/m.

19. The energy storage device according to claim 11, wherein the energy storage device comprises a lithium ion battery.

* * * * *